US006765606B1

(12) United States Patent
Iddan et al.

(10) Patent No.: US 6,765,606 B1
(45) Date of Patent: Jul. 20, 2004

(54) THREE DIMENSION IMAGING BY DUAL WAVELENGTH TRIANGULATION

(75) Inventors: Gavriel J. Iddan, Haifa (IL); Giora Yahav, Haifa (IL)

(73) Assignee: 3DV Systems, Ltd., Yokneam (IL)

( * ) Notice: Subject to any disclaimer, the term of this patent is extended or adjusted under 35 U.S.C. 154(b) by 0 days.

(21) Appl. No.: 09/554,525

(22) PCT Filed: Nov. 13, 1997

(86) PCT No.: PCT/IL97/00370

§ 371 (c)(1),
(2), (4) Date: May 11, 2000

(87) PCT Pub. No.: WO99/26083

PCT Pub. Date: May 27, 1999

(51) Int. Cl.[7] .......................... H04N 15/00; G01C 3/08; G01J 1/20
(52) U.S. Cl. ...................... 348/42; 356/4.01; 250/201.1
(58) Field of Search .............................. 348/31, 37, 42, 348/43, 67, 68; 356/4.01, 3.06, 5.1, 141.2, 609, 3.01, 615; 250/201.1, 609, 548, 557, 208.2, 559.22, 559.24

(56) References Cited

U.S. PATENT DOCUMENTS

| | | | | |
|---|---|---|---|---|
| 4,264,208 A | * | 4/1981 | Haberl et al. | 356/609 |
| 4,725,146 A | * | 2/1988 | Hutchin | 356/615 |
| 5,057,681 A | * | 10/1991 | Beder et al. | 250/208.2 |
| 5,434,612 A | * | 7/1995 | Nettleton et al. | 348/31 |
| 5,754,280 A | | 5/1998 | Kato et al. | |
| 6,181,411 B1 | * | 1/2001 | Harris et al. | 356/4.01 |

FOREIGN PATENT DOCUMENTS

| | | |
|---|---|---|
| WO | WO 97/01111 A3 | 1/1997 |
| WO | WO 97/01111 A2 | 1/1997 |

OTHER PUBLICATIONS

Schubert, E. et al.; Fast 3D Object Recognition Using a Combination of Colour–Coded Phase–Shift Principle and Colour–Coded Triangulation; SPIE; vol. 2247; Sensors and Control for Automation; 1994; pp. 202–213; XP 00613459.
Geng, Z. J.; "Rainbow Three–Dimensional Camera: New Concept of High–Speed Three–Dimensional Vision Systems"; Opt. Eng.; vol. 35; No. 2; Feb 1996; pp. 376–383.
Klicker, J.; "A Very Compact Two–Dimensional Triangulation–based Scanning System for Robot Vision"; SPIE; vol. 1822; 1992; pp. 217–227.
Kuwamura, S. et al.; "Wavelength Scanning Profilometry for Real–Time Surface Shape Measurement"; Applied Optics; vol. 36; No. 19; pp. 4473–4482; Jul. 1, 1997.
Nayar, S. K. et al.; "Real–Time Focus Range Sensor"; IEEE Transactions on Pattern Analysis and Machine Intelligence; vol. 18; No. 12; pp. 11861197; Dec. 1996.

* cited by examiner

*Primary Examiner*—Gims Philippe
(74) *Attorney, Agent, or Firm*—Fenster & Company

(57) ABSTRACT

An apparatus is provided for 3D imaging of an object comprising a scanning light beam encoded with position data corresponding to the spatial position of the scanning light beam, and an imaging system that images localized surface areas of the object illuminated by the scanning light beam, which imaging system records the position data coded into the scanning beam so that three spatial coordinates of the localized surface areas imaged are determinable using the recorded position data.

50 Claims, 2 Drawing Sheets

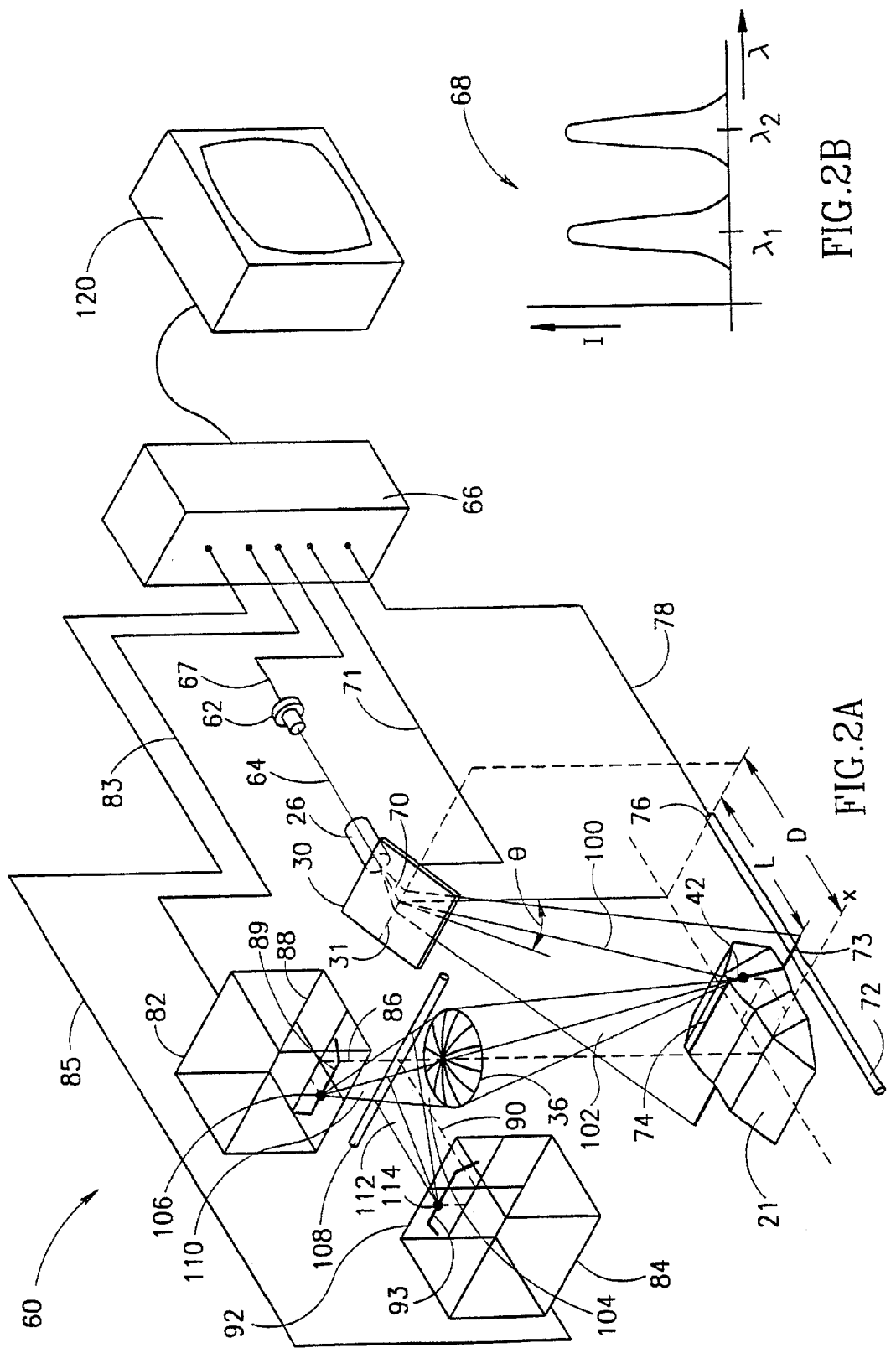

THREE DIMENSION IMAGING BY DUAL WAVELENGTH TRIANGULATION

RELATED APPLICATIONS

The present application is a US National application of PCT/IL97/00370, filed Nov. 13, 1997.

FIELD OF THE INVENTION

The invention relates to three dimensional visual imaging, and in particular to recovering a three dimensional image of an object from a two dimensional image of the object.

BACKGROUND OF THE INVENTION

The real world has three spatial dimensions. The biological eye, cameras and other visual sensing devices however, image reality by projecting light from three dimensional objects onto two dimensional surfaces (more accurately, surfaces defined by two independent variables). These imaging systems thereby "lose" one of the three dimensions of reality. The depth of view, or the distance of objects from the vision imaging system is not registered. Nature has invested heavily in recovering the third dimension and has provided living systems with 3D visual imaging systems. Biological systems do this generally by coupling the eyes in a stereoscopic geometry and providing the brain with highly sophisticated pattern recognition capabilities that interpret what the eyes see.

Human technology is subject to considerable stimulus to copy nature and provide man made vision imaging systems that provide some of the same real time 3D capabilities of biological systems. As human technology progresses and becomes more sophisticated, the need and demand for such 3D vision imaging systems become ever more intense.

Three dimensional visual imaging systems are needed for a rapidly growing list of many different applications, such as profile inspection of manufactured goods, thickness measurements, CAD verification and robot vision. Many of these applications require 3D visual imaging systems that provide a complete 3D "depth map" of the surface of the object in real time. A depth map is basically a topographical map, very much like a geographic topographical map, of the surface of the object as seen from the perspective of the imaging system. Real time imaging is considered to be imaging that can provide image frames at video frame rates from 25 Hz and up.

Different technical approaches are used to provide 3D visual imaging. Many of these approaches, at the present level of technology, are unable to provide satisfactory low cost 3D imaging in real time.

Attempts to copy nature and provide man made vision with real time stereoscopic vision have proven to be extremely difficult. Stereo vision systems which are useable for non quantitative depth sensing are computationally complicated, and at the present state of the art are inaccurate and too slow for many applications and for real time 3D imaging.

Visual image systems using range from focus, which determine range by determining at what focal length features on an object are in focus, are often unsatisfactory, at least in part, because they are slow. Range from focus systems require the acquisition and analysis of many image frames taken at different focus settings of the system's optics to determine range to a particular feature or group of features of an object imaged. On the other hand, an imaging system using range from defocus, as reported in IEEE Transactions on Pattern Analysis and Machine Intelligence, Vol 18, No 12, December 1996 by S. K. Nayar et al, is rapid and can produce a 512×480 depth map of an object at video frame rates (30 Hz). However, it is relatively inaccurate and limited in range.

Time of flight systems, using laser ranging, measure the range to many points on the surface of an object to produce a 3D map of the object. Points on the surface are sequentially illuminated by laser light and the traversal time of the light to each point and back to the imaging system is measured. While capable of providing accurate distance measurements, the sequential nature of the measurement process causes such systems to be slow.

A type of 3D imaging system which is very rapid is described in PCT patent application PCT/IL/96/00020 filed through the Israel Patent Office by the same applicant as the applicant of the present application, and published as International Publication WO97/01111, which is incorporated herein by reference.

A visual imaging system described in an article "Wavelength Scanning Profilometry for Real Time Surface Shape Measurement" by S. Kuwamura and Ichirou Yamaguchi, in Applied Optics, Vol. 36, No 19, July 1997, proposes 3D imaging by ranging using interference between two variable wave length beams. One of the beams is reflected off a reference mirror and the other off the surface of an object being visualized. The wavelength of the laser light beams is varied over a continuous range and the intensity of the interfering laser beams at each pixel of a CCD detector array is monitored. The range to a point can be determined by the number of times the interference pattern at a pixel at which the point is imaged goes through a minimum for a given change in laser wavelength. The concept is in the experimental stage and, while accurate, it appears to be limited in field of view and in the maximum difference between distances to the surface that it can effectively measure.

A particularly robust and simple method of 3D imaging is active triangulation. In active triangulation, generally, a thin fan beam of laser light illuminates the surface of an object along a thin stripe on the surface. Light reflected from the illuminated stripe is incident on pixels in a detector array, such as a detector array in a CCD camera. Each illuminated pixel in the array is illuminated by light reflected from a different, highly localized, spot on the stripe. The position of an illuminated pixel in the array and the angle, hereafter the "scan angle", that the plane of the fan beam makes with a reference coordinate system is sufficient to determine the three spatial coordinates of the spot on the surface of the object which is the source of reflected laser light illuminating the pixel. To produce a complete 3D map of the surface of the object, the scan angle is incremented so that the fan beam scans the surface of the object, illuminating it successively along different closely spaced stripes on the surface. For each of these closely spaced stripes, the 3D coordinates of the spots corresponding to illuminated pixels are calculated.

However, if all the illuminated pixels in the scan are recorded on a same CCD image frame it is impossible to associate a particular pixel with the scan angle from which it was illuminated. Conventionally, therefore, a complete, single, image frame is acquired and processed for each illuminated stripe in order to maintain correspondence between illuminated pixels and the scan angles at which they are illuminated. Since only a small fraction of the pixels in a frame are illuminated for each stripe this is an extremely wasteful and slow way to acquire data. Furthermore each of the pixels in a frame has to be processed in order to determine which of the pixels is illuminated. Not only is the data collection method wasteful but it is also very slow.

In an article entitled "A Very Compact Two-dimensional Triangulation-based Scanning System for Robot Vision" by Jurgen Klicker in SPIE Vol. 1822 (1992)/217, an active triangulation imaging system is presented that is fast enough for real time imaging. This system is however relatively expensive, and it requires integrating the system's camera with special circuits that translate data processing tasks into hardware.

Another attempt to increase the speed of 3D imaging using active triangulation is reported by Z. Jason Geng, in Opt. Eng. 35(2) 376–383 (February 1996). In this method, an object is illuminated by a wide solid angle cone of light. The color of light rays in the cone is varied as a function of position in the cone in such a way that light rays having the same color illuminate the object at a same angle. The angle is known from the geometry of the cone. The color of the light reflected from a point on the surface of the object therefore identifies the angle at which the point is illuminated by light from the light cone The system, while appearing to be fast has yet to be proven to be accurate. Accuracy will most probably be affected by ambient lighting conditions and suffer from variations in color reflectivity of the surface of the object imaged.

There is a need for a real time 3D visual imaging system that provides precision measurements of a surface's contours, that is insensitive to ambient lighting conditions and variability in surface reflectivity, and that is mechanically and computationally inexpensive and simple.

SUMMARY OF THE INVENTION

It is an object of the present invention to provide a 3D real time visual imaging system that is computationally and mechanically simple, that is relatively insensitive to ambient lighting conditions and surface reflectivity of objects imaged, and that can provide precision imaging at relatively low cost.

A 3D visual imaging system, in accordance with a preferred embodiment of the present invention, accomplishes this object using an active triangulation imaging system. A laser light beam, preferably a fan beam, scans an object being imaged. The scan angle is coded into the light in the fan beam. Detector pixels in the imaging system illuminated by reflected light from a stripe on the surface of the object illuminated by the fan beam, register the scan angle coding when they register the intensity at which they are illuminated. Each illuminated pixel therefore is coded with information that can be used to determine the scan angle at which it is illuminated.

By coding each illuminated pixel with scan angle information, a complete image frame does not have to be acquired and processed for each scan angle in order to associate pixels with the scan angle at which they are illuminated. This reduces both the data acquisition time and data processing time in comparison to conventional 3D triangulation imaging. As a result, a 3D imaging system, in accordance with a preferred embodiment of the present invention, can provide real time precision imaging using a simple triangulation procedure. Furthermore, a 3D imaging system, in accordance with a preferred embodiment of the present invention, does not require special equipment, and can be built inexpensively using substantially standard, off the shelf components and simple circuits.

In a visual imaging system, in accordance with a preferred embodiment of the present invention, an object to be imaged is scanned, preferably, with a laser fan beam having narrow peaks of intensity at different wavelengths, hereafter "peak wavelengths". Preferably the peak wavelengths are closely spaced so that reflection from the surface is substantially the same for light at any of the peak wavelengths. As the fan beam scans the object, the intensity of the fan beam at the different peak wavelengths is modulated so a set of ratios, hereafter "intensity ratios" between the intensities at the peak wavelengths is different at each scan angle used in the scan of the object, i.e., the intensity ratios are defined as a function of the scan angle, so that the scan angle is a single valued function of the intensity ratios.

Preferably, the imaging system comprises at least two pixel arrays. Preferably, the number of pixel arrays is equal to the number of different peak wavelengths. Preferably, each different pixel array is sensitive to light in a single narrow band of wavelengths centered at a different one of the peak wavelengths. All of the pixel arrays in the system are preferably homomorphic.

The pixel arrays are accurately positioned in the system in known locations. The positioning is such, that whenever a pixel in one array is illuminated by fan beam light reflected from the object, preferably, a single pixel, corresponding uniquely to the illuminated pixel, in each of the other pixel arrays, is also illuminated by fan beam light reflected from the object. These corresponding pixels, one from each of the different pixel arrays, define a pixel group. The number of pixels in a pixel group is equal to the number of pixel arrays and each pixel belongs to one and only one pixel group. The pixels in a pixel group are always illuminated simultaneously. Since each of the pixels in a pixel group is sensitive to light at a different peak wavelength, when a pixel group is illuminated by fan beam light reflected from the object, the intensity of the reflected fan beam light at each of the peak wavelengths is measured. The intensity values measured by the pixels in a pixel group thereby measures and identifies the intensity ratios of the reflected fan beam light illuminating the pixel group. Assuming the reflectivity of the object is substantially the same for light at each of the peak wavelengths, the intensity ratios of the reflected fan beam light is substantially the same as the intensity ratios of the fan beam illuminating the object.

Since the scan angle is a unique function of intensity ratios of the fan beam, the intensity ratios measured by the pixel group therefore measure and identify the scan angle at which the pixels in the group are illuminated.

In accordance with a preferred embodiment of the present invention an object is scanned by the laser fan beam over a range of closely spaced scan angles. The surface of the object is thereby successively illuminated along different closely spaced stripes on the surface. Each stripe is imaged in each of the pixel arrays, generally along a curved or segmented line of pixels. The image in each of the pixel arrays represents a profile, from light of a different peak wavelength, of that portion of the object illuminated by the fan beam. Each small localized region of the stripe reflects light into the imaging system and illuminates the pixels of a different pixel group. Preferably, the pixels in the pixel group are in the same relative positions in their respective arrays.

When the scan is complete, each of the pixel arrays has a pattern of pixels which have been illuminated and have registered different light intensities, i.e. each pixel array has an "image frame" of pixels illuminated at various light intensities. By collating the registered light intensities from all the image frames according to pixel group and comparing the light intensities within a group with each other, in accordance with a preferred embodiment of the present invention, the scan angle at which each pixel in the imaging system was illuminated is determined. The three position coordinates of the point on the surface of the object from which each pixel was illuminated can therefore be calculated and a 3D image of the object constructed.

Since each pixel can be uniquely associated with the scan angle at which it was illuminated there is no need to acquire a different pixel array image frame for each scan angle. Data from all the scan angles used in a scan is registered simultaneously in all the pixel arrays, in the time it takes to acquire a single image frame, ~33 msec or less for conventional video. The scan, and the 3D imaging, of the object can therefore be performed in real time.

In the case where scanning of an object by the laser fan beam, in accordance with a preferred embodiment of the present invention, is performed in the presence of additional light sources and/or ambient light which illuminates the object, the object is imaged in the pixel arrays simultaneously by light from the laser fan beam and by light from the additional light sources and/or ambient light, hereafter referred to as "background light". Images in the pixel arrays from the background light will degrade the correspondence between the intensity ratios and the scan angles from which pixel groups are illuminated and thereby degrade the 3D image of the object constructed from the images registered on the pixel arrays. In a preferred embodiment of the present invention images obtained with a fan beam in the presence of background light are corrected by subtracting from the images the contributions to the images resulting from the background light. In order to perform the correction, images of the object are first made with the background light in the absence of the laser fan beam light. As a result, an image of an object obtained in accordance with a preferred embodiment of the present invention, is relatively insensitive to illumination of the object by ambient light and by light from additional light sources.

In a preferred embodiment of the present invention, the difference between peak wavelengths is small relative to the peak wavelengths. This reduces the possibility that variations in the reflectivity of the surface of an object scanned will affect intensity measurements and degrade the correspondence between the measured fan beam intensity and the actual fan beam intensity.

Alternatively or additionally, in order to correct for variations in the reflectivity of different local regions of the surface of an object imaged, a calibration image of the object is preferably obtained by imaging the object with the same intensity of light for all peak wavelengths and for all scan angles used to image the object. For subsequent images of the object, the intensity of light measured at each pixel of each pixel array is preferably divided by the intensity of the light measured for the pixel in the calibration image. This yields for each pixel in an image of the object a reflectivity corrected intensity for the pixel. The reflectivity corrected intensities are substantially independent of differences in reflectivity of different local regions of the surface of the object. The corrected intensities represent more accurately the intensities of light in the fan beam from which the pixels are illuminated than do the intensities themselves. Therefore, a more accurate determination of the scan angle from which a pixel is illuminated can be determined using reflectivity corrected intensities than by using the uncorrected intensities. As a result, an image of an object obtained in accordance with a preferred embodiment of the present invention, is substantially independent of differences in the reflectivity of different regions on the surface of the object imaged. Preferably, the light in the fan beam is radiated by laser chips packaged in a same housing. Alternatively, and preferably, the fan beam can be composed by combining light beams radiated by separate lasers using beam combiners, where each of the separate lasers lases at a different one of the peak wavelengths.

In a preferred embodiment of the invention, the correspondence between a scan angle and a particular fan beam set of intensity ratios is verified and/or controlled using a position sensing device ("PSD"). A PSD, preferably in the shape of a long narrow strip, is accurately positioned with respect to the fan beam, preferably on a surface on which an object to be scanned is located. The orientation of the PSD is preferably such, that for each setting of the scan angle, a substantially different thin stripe on the PSD, perpendicular to the long dimension of the PSD, is illuminated. Each position of the stripe along the PSD therefore defines a particular scan angle. As the scan angle increases or decreases, the position of the thin illuminated stripe along the length of the PSD moves by a corresponding amount. The position of the illuminated stripe along the length of the PSD is preferably sensed and suitably measured by the PSD and the measured position transmitted to an appropriate control unit. The position of the stripe along the PSD can be used to monitor the fan beam position or to control, in a closed loop real time control system, the position of the fan beam and determine the intensity ratios of the peak intensities in the fan beam as a function of scan angle.

In some preferred embodiments of the present invention, the intensity ratios of the fan beam as a function of scan angle are registered on the pixel arrays. Fan beam light reflected from a surface region having an accurately known shape and which is accurately positioned with respect to the fan beam, and preferably, near to the object imaged, is imaged on the pixel arrays. Since the position and shape of the reflecting surface is accurately known, the scan angle from which the fan beam light is reflected can be calculated from the positions of the pixels in the pixel arrays at which the reflected fan beam light is imaged. The ratio of the intensities of the images at these pixel positions gives the fan beam intensity ratios of the fan beam for the calculated scan angle.

In a preferred embodiment of the present invention the laser fan beam has a narrow peak of intensity at two different peak wavelengths. Preferably, the intensity of light at one of the peak wavelengths increases linearly with scan angle and the intensity of light at the other peak wavelength decreases linearly with scan angle. The fan beam therefore has a unique intensity ratio for each scan angle, with the intensities of the light at the two peak wavelengths and their ratio having unique values for each scan angle.

Preferably, the imaging system comprises two identical CCD cameras. Preferably, the optic axes of the two cameras intersect at 90°. The cameras preferably share a common objective lens. The optic distance from the center of the objective to each of the cameras is preferably the same. Preferably, a beam splitter at 45° to the optic axis of each of the cameras is located at the intersection of the optic axes of the two cameras. The beam splitter preferably divides light passing through the objective lens between the two cameras, according to the wavelengths of the light.

The cameras share a same field of view. An object placed in the field of view is imaged in both cameras so that preferably, a pixel in the image of the object in one camera corresponds to one and only one pixel in the image of the object in the other camera. Each set of such corresponding pixels, one from each of the cameras, forms a pixel group, in accordance with a preferred embodiment of the present invention. Accurate correspondence and registration between pixels in the different pixel arrays can be achieved by using splitting prisms commonly used in quality color camera systems.

The light entering each of the cameras is preferably filtered so that one of the cameras is sensitive only to light having a wavelength in a narrow band of wavelengths centered at one of the peak wavelengths and the other camera is sensitive only to light having a wavelength in a narrow band of wavelengths centered at the other peak wavelength. More preferably, the beam splitter is a narrow band reflective filter, so that the beam splitter performs the filtering for the two cameras.

An object to be imaged is positioned in the field of view of the cameras and is then scanned by the laser fan beam which rotates through a range of scan angles. Each CCD camera preferably acquires an image of the object in a single image frame by exposure to light at a different one of the peak wavelengths of the fan beam.

The scan angle at which a pixel in an image frame is acquired can be determined by dividing the intensity of the light registered by the pixel by the intensity of light registered by its corresponding pixel in the other image frame (i.e. by the intensity measured by the other pixel in the pixel group to which the pixel belongs). The result of the division is the ratio between the light intensities for the two peak wavelengths of the fan beam at the scan angle at which the pixel was illuminated. Alternatively, the scan angle can preferably be determined by using a look up table which associates each scan angle with a different pair of intensity values. The three position coordinates of the point on the surface of the object from which the pixel was illuminated can therefore be calculated. Repeating the process for each pixel in the image frame gives a 3D map of the object.

There is therefore provided in accordance with a preferred embodiment of the present invention an apparatus for imaging an object comprising: a scanning light beam, encoded with data corresponding to an illumination position of the scanning light beam, which illumination position data comprises at least one of the location and orientation of the scanning light beam; a controller which positions the coded scanning light beam at successive illumination positions so as to selectively illuminate localized surface regions of the object; and an imaging system comprising at least one photosensitive imager light sensor which images respective localized surface areas of a surface region illuminated by the scanning light beam on respective localized image areas of the at least one photosensitive imager and wherein, at said localized image areas, illumination position code data is recordable; wherein three spatial coordinates of a localized surface area imaged by said at least one photosensitive imager are determinable from the location of the localized image area at which said localized surface area is imaged and the illumination position code data recorded at said localized image area.

Preferably, the scanning light beam is a light beam having a controllable intensity, and the scanning light beam is encoded with illumination position data by controlling the intensity of light in the scanning light beam so that the intensity is different for different illumination positions.

The scanning light beam preferably comprises light in at least two bands of wavelengths and encoding the scanning light beam comprises controlling the relative intensity of light in the at least two bands of wavelengths. Preferably, the bands of wavelengths are substantially non-overlapping bands of wavelengths. Alternatively or additionally, the bands of wavelengths are preferably narrow bands of wavelengths. Alternatively or additionally, a band of wavelengths comprises substantially one wavelength.

In some preferred embodiments of the present invention the reflectivity of the surface of the object for light of different bands of wavelengths in the scanning light beam is substantially the same. In some preferred embodiments of the present invention the wavelengths of light in the bands of wavelengths of the scanning light beam are sufficiently close to each other so that the reflectivity of the surface of the object for the light of different wavelength bands is substantially the same.

In some preferred embodiments of the present invention the encoding of the scanning light beam comprises varying intensity of light in one band of wavelengths so that it is a linear increasing function of an illumination position variable and varying the intensity of light in another band of wavelengths so that it is a linear decreasing function of the illumination position variable.

In some preferred embodiments of the present invention the at least one photosensitive imager is a single photosensitive imager. Preferably, the single photosensitive imager images the object with light having wavelengths in each of the wavelength bands encoded with illumination position data and wherein light from different wavelength bands are imaged at different locations in the single photosensitive imager.

In other preferred embodiments of the present invention the at least one photosensitive imager comprises one photosensitive imager for each of the wavelength bands encoded with illumination position data.

In some preferred embodiments of the present invention the scanning light beam comprises two substantially coincident laser beams of light having different wavelength bands.

In some preferred embodiments of the present invention wherein the at least one photosensitive imager is a single photosensitive imager the photosensitive imager images the object with light of the same wavelength at all imaging areas of the photosensitive imager. Preferably, images of the object corresponding to the same illumination positions are recorded with a first intensity in a first image frame and a second intensity in a second image frame of the single photosensitive imager and the ratio of the intensities between an image of the object in the first frame and an image of the object in the second image frame determines the illumination position from which the images were illuminated.

In some preferred embodiments of the present invention the scanning light beam is substantially a pencil beam.

In other preferred embodiments of the present invention the scanning light beam is a thin planar fan beam. Preferably, the illumination position of the fan beam is defined by the location and orientation of an axis in the plane of the fan beam and a scan angle, wherein the scan angle is an angle of rotation of the fan beam about the axis.

In some preferred embodiments of the present invention the scanning light beam comprises at least one laser beam.

In some preferred embodiments of the present invention images of the object from light reflected from the scanning light beam at a plurality of illumination positions are recorded in one image frame of the at least one photosensitive imager.

Some preferred embodiments of the present invention comprise a processor which determines three spatial coordinates for each of a plurality of localized surface areas of the object by decoding position code data recorded at a plurality of image areas of light sensors and the processor uses the determined spatial coordinates to provide a three dimensional image of the object.

In some preferred embodiments of the present invention a photosensitive imager comprises an array of light sensitive elements.

There is also provided in accordance with a preferred embodiment of the present invention a method for 3 dimensional imaging of an object comprising: (a) providing a scanning light beam comprising light of at least one wavelength, encoded with data corresponding to an illumination position of the scanning light beam, wherein the illumination position of the scanning light beam comprises at least one of the location and orientation of the scanning light beam; (b) reflecting light of the scanning light beam from the surface of the object from at least one illumination position of the scanning light beam; (c) imaging a plurality of light rays of the reflected light on at least one photosensitive imager, wherein each of the plurality of light rays is reflected from a localized region on the surface of the object and light rays reflected from substantially different localized regions are imaged at different localized image regions of the at least one photosensitive imager; (d) registering illumination position data encoded in the reflected light rays at the localized image regions at which the reflected light rays are imaged; and (e) determining three spatial coordinates for localized regions on the surface of the object from which light rays are reflected, using locations on the at least one photosensitive imager of said localized image regions and said illumination position data.

Preferably, providing a scanning light beam encoded with data corresponding to an illumination position of the scanning light beam, comprises controlling the intensity of the scanning light beam to be different for different illumination positions. Preferably, registering illumination position data comprises registering the intensity of light rays imaged. Controlling the intensity of the scanning beam preferably comprises controlling the intensity of light in the scanning beam as a function of wavelength.

Preferably, the scanning light beam comprises at least two wavelength bands of light, wherein controlling the intensity of light in the scanning beam comprises controlling the intensity of light in each band independently of the intensity of light in the other of the at least two bands of the scanning light beam.

Controlling the intensity of light preferably comprises controlling the intensity of light in the wavelength bands so that ratios between the intensities of light in different wavelength bands is different for different illumination positions.

Preferably, controlling the intensity of light comprises controlling the intensity of light in one of the at least two bands so that the intensity in one of the at least two bands is a linear increasing function of an illumination position parameter and controlling the intensity of light in a different one of the at least two bands so that it is a linear decreasing function of the illumination position parameter.

In some preferred embodiments of the present invention the wavelength bands are non-overlapping wavelength bands. Alternatively or additionally, at least one wavelength band of the wavelength bands is preferably a narrow band of wavelengths. In some preferred embodiments of the present invention, at least one wavelength band of the wavelength bands comprises substantially one wavelength.

In some preferred embodiments of the present invention, the at least one photosensitive imager is one photosensitive imager. Light rays having wavelengths in different wavelength bands of the scanning light beam are preferably imaged at different localized image locations of the photosensitive imager.

In other preferred embodiments of the present invention the at least one photosensitive imager comprises at least two photosensitive imagers. Preferably, light rays of the plurality of reflected light rays having wavelengths in different wavelength bands of the scanning light beam are imaged so that for any pair of photosensitive imagers of the at least two photosensitive imagers, there is at least one wavelength band such that, light rays having wavelengths in this at least one wavelength band are imaged by only one of the pair of the photosensitive imagers. Alternatively, each of the at least one photosensitive imagers preferably images light rays having wavelengths in only one of the wavelength bands of the scanning light beam.

In some preferred embodiments of the present invention wherein the at least one photosensitive imager is a single photosensitive imager, imaging reflected rays preferably comprises imaging reflected rays twice for each of the at least one illumination positions.

In some preferred embodiments of the present invention, the scanning light beam is substantially a pencil beam.

In other preferred embodiments of the present invention the scanning light beam is a thin planar fan beam. Preferably, the illumination position of the fan beam is defined by at least one of, the position of an axis in the plane of the fan beam and a scan angle, wherein the scan angle is an angle of rotation of the fan beam about the axis and wherein the fan beam is encoded with the scan angle. Preferably, reflecting light from the surface of the object for at least one illumination position of the scanning light beam comprises reflecting light from the surface of the object from a scan angle.

In some preferred embodiments of the present invention the reflectivity of the surface of the object for light of different wavelengths in the scanning light beam is substantially the same. Additionally or alternatively, the wavelengths of light in the scanning light beam are sufficiently close to each other so that the reflectivity of the surface of the object for the light of different wavelengths in the scanning light beam is substantially the same.

In some preferred embodiments of the present invention the scanning light beam comprises at least one laser beam.

In some preferred embodiments of the present invention the at least one illumination position comprises a plurality of illumination positions. Preferably, recording images of reflected light rays comprises recording images of reflected light rays from at least two of the plurality of illumination positions on one image frame of the at least one photosensitive imager.

In some preferred embodiments of the present invention reflecting and imaging a plurality of light rays comprises: (i) performing a first imaging of light rays reflected from localized surface regions of the object wherein the intensity of the scanning light beam is the same for each of the at least one illumination positions from which the light rays are reflected; and (ii) performing a second imaging of light rays reflected from the localized surface regions of the object wherein the intensity of the scanning light beam is different for each of the at least one illumination positions from which the light rays are reflected; and determining three spatial coordinates comprises dividing the intensity of light rays reflected from a localized region of the surface of the object from the second imaging by the intensity of light rays reflected from the localized region from the first imaging.

In some preferred embodiments of the present invention: reflecting and imaging a plurality of light rays comprises: (i) performing a first imaging of light rays reflected from localized surface regions of the object from light illuminating the object from ambient light sources; and (ii) performing a second imaging of light rays reflected from the localized surface regions of the object from light in the scanning light beam; and determining three spatial coordinates comprises subtracting the intensity of light rays reflected from a localized region of the surface of the object from the second imaging from the intensity of light rays reflected from the localized region from the first imaging.

In some preferred embodiments of the present invention the at least one photosensitive imager comprises an array of light sensitive elements.

Some preferred embodiments of the present invention comprise producing a three dimensional image of the object using the determined spatial coordinates of localized regions on the surface of the object from which light rays are reflected.

BRIEF DESCRIPTION OF FIGURES

The invention will be more clearly understood by reference to the following description of preferred embodiments thereof in conjunction with the figures, wherein identical structures, elements or parts which appear in the figures are labeled with the same numeral, and in which:

FIG. 2A shows a schematic of a visual imaging system in accordance with a preferred embodiment of the present invention with a fan beam at a scan angle θ, imaging an object; and FIG. 2B shows a dependence of a laser fan beam intensity profile as a function of scan angle in accordance with a preferred embodiment of the present invention.

DETAILED DESCRIPTION OF PREFERRED EMBODIMENTS

Figure 1:
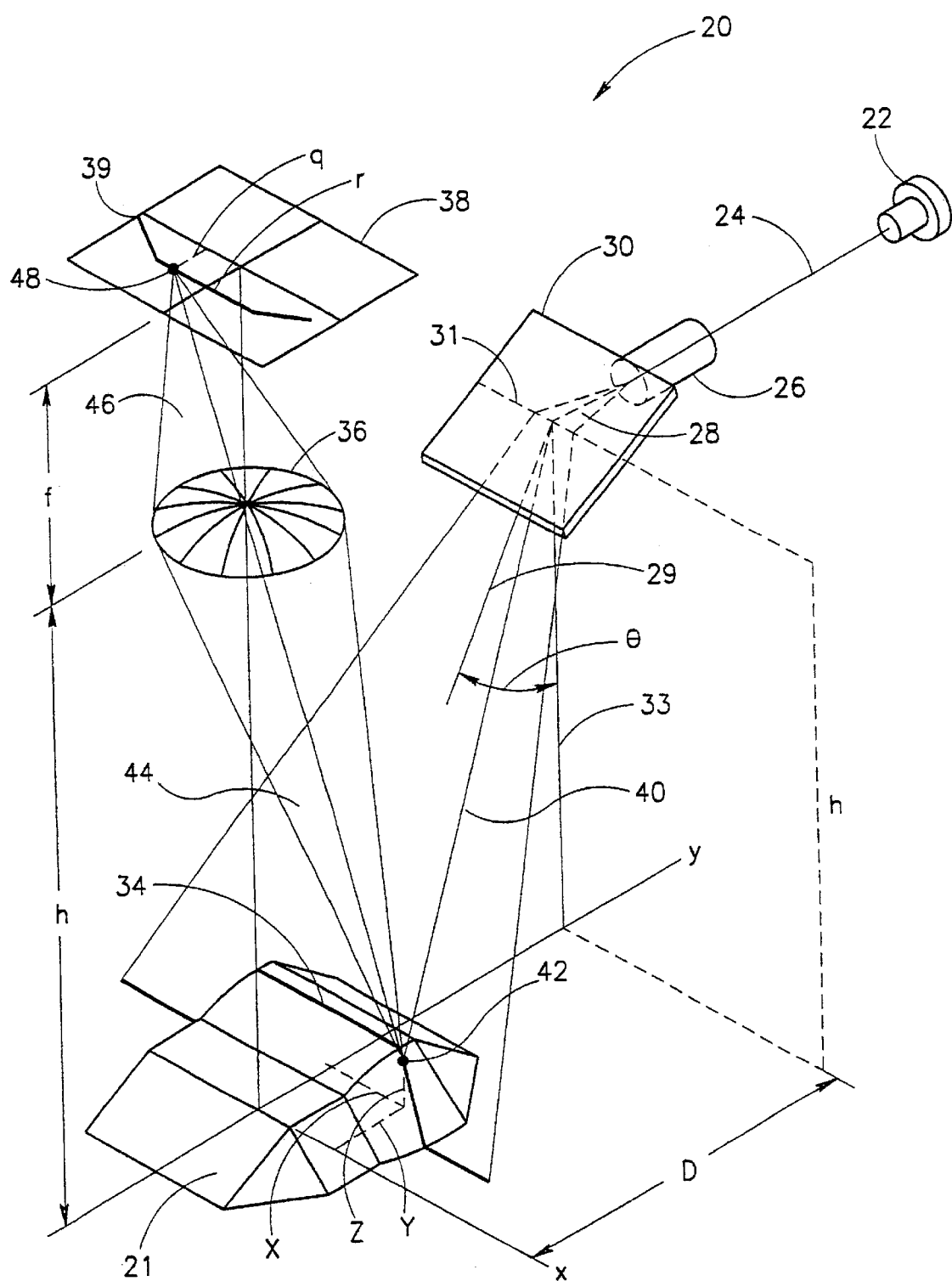
FIG. 1 shows a schematic of a conventional triangulation visual imaging system with a fan beam at a scan angle θ, imaging an object.

FIG. 1 shows a schematic of a conventional triangulation imaging system 20 imaging an object 21. A laser 22, emits a beam 24 of laser light, which enters a transmission optics module 26. Transmission optics module 26 collimates and expands beam 24 to form a thin fan beam 28 of light. Fan beam 28 is incident on a scanning mirror 30 along a line 31. Scanning mirror 30 reflects fan beam 28 at a scan angle i, which is measured between a central ray 29, of fan beam 28 and a line 33. Line 33 is preferably perpendicular to both line 31 and the direction of beam 24. Scan angle θ is preferably changed by rotating scanning mirror 30 about an axis coincident with line 31. This structure is commonly used in triangulation type systems. (in some systems a polygonal scanner is used in place of scanning mirror 30 to change scan angle θ).

At scan angle θ, fan beam 28 illuminates a thin stripe 34 on the surface of object 21. Light reflected from points on the surface of object 21, along stripe 34, passes through a lens 36, of a CCD camera (not shown) and is incident on a band of pixels 39 in a focal plane 38, of the camera. The optic axis of lens 36, the direction of beam 24, Line 33 and central ray 29 are preferably coplanar.

A convenient set of coordinate axes for measuring distances between elements of the system has its z axis coincident with the optical axis of lens 36 and its y axis oriented so that beam 24, line 29, and line 33 are in the yz plane. Lens 36 is typically located at a height h, along the z axis above the xy plane on which object 21 is placed. Focal plane 38 is typically situated a distance f above lens 36 along the z axis. Line 33 is preferably parallel to the z axis at a distance D from the z axis. Line 31 is preferably perpendicular to the yz plane at the same height h above the xy plane as lens 36.

A bundle of light rays 40 in fan beam 28 is incident on a point 42, in stripe 34. Point 42 is located in space by coordinates X, Y, Z. A diverging cone of light rays 44, reflected from point 42, passes through lens 36 and is focused, in a converging light cone 46, onto a pixel 48, in pixel band 39. Pixel 48 is located on focal plane 38 by coordinates q and r. A straight line 50, through point 42 and the center of lens 36 meets pixel 48 and is the central light ray of light cones 44 and 46.

From the geometry of the schematic shown in FIG. 1 the coordinates X, Y, Z, of point 42 are given by: $Y=qD/[q+f*\tan\theta]$, $Z=h(1-Y*f/[h*q])$, $X=(h-Z)*(r/f)$.

To determine the coordinates of substantially all the points on the surface of object 21 and produce a 3D map of object 21 scan angle θ is varied through a range of values so as to illuminate object 21 successively along different closely spaced stripes 42. However, in order to retain correspondence between the pixels in pixel band 39 and scan angle θ, a complete image frame of focal plane 38 is grabbed and processed for each scan angle θ and stripe 42.

FIG. 2A shows a visual imaging system 60 for imaging object 21 in accordance with a preferred embodiment of the present invention.

Visual imaging system 60 preferably comprises a laser unit 62, comprising two lasers (not shown), preferably lasing at nearby frequencies $\lambda 1$ and $\lambda 2$. Laser unit 62 therefore preferably produces a laser beam 64 having a light intensity profile with sharply defined narrow peaks at wavelengths $\lambda 1$ and $\lambda 2$. The intensity with which each of the lasers in laser unit 62 lases is preferably independently controlled by a processor 66 to which it is connected by a data and control channel 67. The intensity of each of the lasers is preferably controlled by controlling the frequency of the laser voltage supplied to that laser. FIG. 2B shows an intensity profile 68 of beam 64 that graphs the intensity "I" of beam 64 against wavelength λ where both lasers are lasing at the same intensity.

Beam 64 preferably enters transition optics module 26 which transforms beam 64 into a fan beam 70. Fan beam 70 is preferably incident on scanning mirror 30 along line 31. The angular position of mirror 30 determines scan angle θ. To perform a complete scan of object 21, scanning mirror 30 is rotated about an axis coincident with line 31, thereby varying scan angle θso that fan beam 70 sweeps across the surface of object 21. In some preferred embodiments of the present invention, a polygonal scanner is used in place of scanning mirror to vary scan angle θ. The rotation of scanning mirror 30 is preferably accomplished by a mirror actuator (not shown) controlled by processor 66 to which the mirror actuator is preferably connected by a control and data channel 71.

In a preferred embodiment of the present invention, the intensities with which each of the two lasers in laser unit 62 emit light are determined as functions of scan angle θ so that scan angle θ is a single valued function of the intensities. Preferably, θ is a single valued function of the ratio of the intensities. If $I_{\lambda 1}$ and $I_{\lambda 2}$ represent the intensities of light in fan beam 70 at wavelengths $\lambda 1$ and $\lambda 2$ respectively then, $\theta = F(I_{\lambda 1}/I_{\lambda 2})$ where F is a single valued function of $I_{\lambda 1}/I_{\lambda 2}$. Therefore, if $I_{\lambda 1}$ and $I_{\lambda 2}$ are measured at an unknown scan angle $\theta$ and are found to have values $I_{\lambda 1\theta}$ and $I_{\lambda 2\theta}$ respectively, then scan angle $\theta$ can be determined from $\theta = F(I_{\lambda 1\theta}/I_{\lambda 2\theta})$. Preferably, the emission intensity of one of the lasers is a linear increasing function of $\theta$ and the emission intensity of the other laser is a decreasing function of $\theta$.

Preferably, imaging system 60 comprises two CCD cameras 82 and 84. Preferably objective lens 36 is common to both CCD cameras 82 and 84. CCD camera 82 has an optic axis 86 and a focal plane 88. CCD camera 84 has an optic axis 90 and focal plane 92. Preferably, optic axes 86 and 90 intersect at 90° at a point 94 and are coplanar with beam 64. Preferably focal-planes 88 and 92 are equidistant from point 94. CCD camera 82 and 84 are preferably connected by control and data channels 83 and 85 to processor 66.

Fan beam 70 illuminates a stripe 74 on the surface of object 21. Stripe 74 is imaged along a band of pixels 89 on focal plane 88 and along a band of pixels 93 on image plane 92. A bundle of light rays 100, in fan beam 70, illuminates a point 42 on stripe 74. A diverging cone of light rays 102 reflected by point 42 passes through lens 36 and is focused in a converging light cone 104 of light rays to a pixel 106, on focal plane 88. Before reaching focal plane 88 light in light cone 104 is preferably split by a beam splitter 108 into two converging light cones 110 and 112. Light cone 110 is focused to a pixel 106 on focal plane 88 and light cone 112 is focused to a pixel 114 on focal plane 92. The central light rays of light cones 102 and 110 are colinear with a straight line 103, which is coincident with the light ray reflected from point 42, through the center of lens 36, to pixel 106.

Pixel 106 on focal plane 88 and pixel 114 on focal plane 92 are corresponding pixels defining a pixel group. Every time one of pixels 106 or 114 is illuminated, the other is illuminated. Beam splitter 108 is preferably positioned and oriented at point 92 with respect to CCD cameras 82 and 84 so that the field of view of CCD cameras 82 and 84 are identical. As a result, every pixel on focal plane 88 has a unique corresponding pixel on focal plane 92 with which it forms a unique pixel group. If one pixel of a pixel group is illuminated, the other is illuminated.

Converging light cone 110 is preferably filtered by a filter (not shown) which transmits only light having a wavelength substantially equal to $\lambda 1$ and converging light cone 112 is preferably filtered by a filter (not shown) which transmits only light having a wavelength substantially equal to $\lambda 2$. Alternatively and preferably, beam splitter 108 is a narrow bandpass filter that transmits light only in a narrow band of wavelengths centered at $\lambda 1$, thereby performing the filtering with lower loss as it splits the beam.

As a result of either of these separation methods, the intensity of the light registered by pixel 106 is proportional to the intensity of the light in fan beam 70 at wavelength $\lambda 1$ and the intensity of the light registered by pixel 114 is proportional to the intensity of the light in fan beam 70 at wavelength $\lambda 2$. Therefore, scan angle $\theta$ at which pixels 106 and 114 are illuminated is coded into the relationship between the light intensities that pixeis 106 and 114 register, in accordance with a preferred embodiment of the present invention, and can be determined from the ratio of these light intensities.

Let $R_{\lambda 1}$ and $R_{\lambda 2}$ represent the reflectivity of the surface of object 21 at point 42 for light of wavelength $\lambda 1$ and $\lambda 2$ respectively and a represent the losses through the system optics from point 42 to either of pixels 106 or 114. If $I_{106}$ and $I_{114}$ represent the intensity of light incident on pixels 106 and 114 respectively, and $I_{\lambda 1\theta}$ and $I_{\lambda 2\theta}$ represent the intensity of light in fan beam 70 at scan angle $\theta$ for wavelengths $\lambda 1$ and $\lambda 2$ respectively, then $I_{106} = \sigma^* R_{\lambda 1} * I_{\lambda 1\theta}$ and $I_{114} = \sigma^* R_{\lambda 1} * I_{\lambda 2\theta}$. Preferably, $\lambda 1$ and $\lambda 2$ are so close that $R_{\lambda 1} = R_{\lambda 2}$, so that $(I_{106}/I_{114}) = (I_{\lambda 1\theta}/I_{\lambda 2\theta})$ and therefore $F(I_{106}/I_{114}) = F(I_{\lambda 1\theta}/I_{\lambda 2\theta}) = \theta$.

Alternatively or additionally, $R_{\lambda 1}$ and $R_{\lambda 2}$ are preferably measured by illuminating point 42 with light at a same intensity, "$C_0$", for both wavelength $\lambda 1$ and wavelength $\lambda 2$. If the intensity of light imaged at pixel 106 from illumination of point 42 with light at wavelength $\lambda 1$ and intensity $C_0$ is $C_{106}$, then $C_{106} = \sigma^* R_{\lambda 1} * C_0$ and $R_{\lambda 1} = C_{106}/[\sigma^* C_0]$. Similarly, $C_{114} = \sigma^* R_{\lambda 2} * C_0$ and $R_{\lambda 2} = C_{114}/[\sigma^* C_0]$. Using these expressions for $R_{\lambda 1}$ and $R_{\lambda 2}$ in the expression for $(I_{106}/I_{114})$ results in $(I_{106}/I_{114}) = (C_{106}/C_{114}) * (I_{\lambda 1\theta}/I_{\lambda 2\theta})$ and therefore $(I_{106}/C_{106})/(I_{114}/C_{114}) = (I_{\lambda 1\theta}/I_{\lambda 2\theta})$ so that $F[(I_{106}/C_{106})/(I_{114}/C_{114})] = \theta$.

From the direction of line 103 and the angle $\theta$, the three spatial coordinates of point 42, (x, y, z) can be calculated by methods well known in the art or by the equations given above.

In accordance with a preferred embodiment of the present invention, processor 66 rotates fan beam 70 through a range of scan angles $\theta$ illuminating object 21 along a succession of closely spaced stripes 74. For each scan angle $\theta$ processor 66 preferably sets the ratio of $I_{\lambda 1}/I_{\lambda 2}$ to a unique value so that $\theta = F(I_{\lambda 1}/I_{\lambda 2})$.

Preferably, visual imaging system 60 comprises a position sensing device, "PSD", 72. PSD 72 is accurately positioned with respect to the other elements of imaging system 60, preferably near to object 21 so that for each scan angle $\theta$, fan beam 70 illuminates object 21, the xy plane, and PSD 72 along a thin stripe 73.

Stripe 73 crosses PSD 72 at a distance L from an end 76 of PSD 72. PSD 72 preferably produces an output signal which is a function of L which signal it transmits to processor 66 over a data channel 78. Processor 66 preferably uses the output signal received from PSD 72 to monitor $\theta$ or control $\theta$ by using the output from PSD 72 to set and control the position of mirror 30. Preferably, the output of PSD 72 is used to control the intensities at which the two lasers in laser unit 62 lase.

At each scan angle $\theta$, each pixel of a trace of pixels in focal planes 88 and 92 of CCD cameras 82 and 84 respectively, registers the intensity of the light at which it is illuminated. Upon completion of a scan, processor 66 preferably down loads an image fame of pixels from each of CCD cameras 82 and 84 over data channels 83 and 85 respectively.

Following downloading, processor 66 determines the scan angle at which each pixel in a down loaded image frame was illuminated by preferably dividing the light intensity registered by the pixel, by the light intensity registered by its corresponding pixel, in the same pixel group, on the other down loaded image frame of pixels. The result of the division is preferably used to determine $I_{\lambda 1}/I_{\lambda 2}$ for the scan angle at which the pixel was illuminated and the scan angle is calculated from $\theta = F(I_{\lambda 1}/I_{\lambda 2})$. Alternatively, the scan angle can preferably be determined using a look up table which associates each scan angle with a different pair of values for the intensities of light registered by a pair of corresponding pixels. Processor 66 then preferably calculates the three spatial coordinates of the point on object 21 from which the pixel was illuminated using the scan angle and the position of the pixel in the image frame.

The coordinates of all the points from which pixels were illuminated are used by processor 66 to provide a 3D image of object 21 which is preferably displayed on a video screen 120 to which processor 66 is connected. Alternatively or additionally the values are used, for example to compare the x,y,z positions to a standard.

The present invention has been described using a non limiting detailed description of a preferred embodiment thereof. Variations of the embodiment described will occur to persons of the art. For example, the two separate CCD cameras can be replaced by a single camera with a single solid state imaging chip such as a CCD or CMOS that has on the one chip pairs of elements each selectively sensitive to different peak wavelengths of the laser fan beam. Such a camera would image different peak wavelengths on different areas of the imaging chip in the same way that conventional color CCD cameras image different colors on different pixels of a light sensitive chip. Also the CCD cameras can be replaced by CMOS, APS or CID_image sensors. In another possible variation of the present invention, a coded pencil beam which scans in two directions can be used instead of a fan beam which scans in one direction. In still other possible variations, position and direction coding of light rays can be accomplished using different multiplicities of peak wavelengths and different functions for relating beam intensities at peak wavelengths to scan angles. A different variation of the invention might code direction into beam intensity using a single peak wavelength and performing two sequential scans at different intensities. In the first scan the intensity of the beam is varied for example, as an increasing function of scan angle and in the second scan the intensity of the beam is varied for example, as a decreasing function of scan angle. A preferred embodiment of the present invention might comprise different features or combinations of features from these variations and from the preferred embodiment.

The detailed description of the preferred embodiment is provided by way of example and is not meant to limit the scope of the invention which is limited only by the following claims:

What is claimed is:

1. Apparatus for imaging an object comprising:
a beam generator that generates a scanning light beam moveable to illuminate the object from different illumination positions, wherein each illumination position is defined by at least one of the location and orientation of the scanning light beam and wherein at each different illumination position the scanning light beam illuminates a different localized surface region of the object;
a controller that positions the beam at successive illumination positions so as to scan the surface of the object and wherein at each illumination position, the controller codes the beam with illumination position data useable to determine the illumination position;
an imaging system comprising at least one photosensitive imager that images respective localized surface areas of the object illuminated by the scanning light beam on respective localized image areas of the at least one photosensitive imager and wherein, at said localized image areas, illumination position data is detectable; and
coordinate computation circuitry that determines three spatial coordinates of a localized surface area imaged by said at least one photosensitive imager from the location of the localized image area at which said localized surface area is imaged and the illumination position data detected at said localized image area.

2. Apparatus according to claim 1 wherein the scanning light beam is a light beam having a controllable intensity, and wherein the controller encodes the scanning light beam with illumination position data by controlling the intensity of light in the scanning light beam so that the intensity is different for different illumination positions.

3. Apparatus according to claim 2 wherein the scanning light beam comprises light in at least two bands of wavelengths and wherein the controller encodes the scanning light beam by controlling the relative intensity of light in the at least two bands of wavelengths.

4. Apparatus according to claim 3 wherein the bands of wavelengths are narrow bands of wavelengths.

5. Apparatus according to claim 4 wherein at least one of the photosensitive imagers is shielded with an optical filter that transmits substantially only light that has a wavelength in at least one of the narrow bands of wavelengths.

6. Apparatus according to claim 3 wherein the reflectivity of the surface of the object for light of different bands of wavelengths in the scanning light beam is substantially the same.

7. Apparatus according to claim 3 wherein the wavelengths of light in the bands of wavelengths of the scanning light beam are sufficiently close to each other so that the reflectivity of the surface of the object for the light of different wavelength bands is substantially the same.

8. Apparatus according to claim 3 wherein the controller encodes the scanning light beam by varying intensity of light in one band of wavelengths so that it is a linear increasing function of an illumination position variable and varying the intensity of light in another band of wavelengths so that it is a linear decreasing function of the illumination position variable.

9. Apparatus according to claim 3 wherein the at least one photosensitive imager is a single photosensitive imager.

10. Apparatus according to claim 9 wherein the single photosensitive imager images the object with light having wavelengths in each of the wavelength bands encoded with illumination position data and wherein light from different wavelength bands are imaged at different locations in the single photosensitive imager.

11. Apparatus according to claim 3 wherein the at least one photosensitive imager comprises one photosensitive imager for each of the wavelength bands encoded with illumination position data.

12. Apparatus according to claim 1, wherein the scanning light beam comprises two substantially coincident laser beams of light Having different wavelength bands.

13. Apparatus according to claim 1 wherein the at least one photosensitive imager is a single photosensitive imager.

14. Apparatus according to claim 13 wherein the photosensitive imager images the object with light of the same wavelength at all imaging areas of the photosensitive imager.

15. Apparatus according to claim 14 wherein images of the object corresponding to the same illumination positions are recorded with a first intensity in a first image frame and a second intensity in a second image frame of the single photosensitive imager and wherein the ratio of the intensities between an image of the object in the first frame and an image of the object in the second image frame determines the illumination position from which the images to were illuminated.

16. Apparatus according to claim 1 wherein the scanning light beam is substantially a pencil beam.

17. Apparatus according to claim 1 wherein the scanning light beam is a thin planar fan beam.

18. Apparatus according to claim 17 wherein the illumination position of the fan beam is defined by the location and orientation of an axis in the plane of the fan beam and a scan angle, wherein the scan angle is an angle of rotation of the fan beam about the axis.

19. Apparatus according to claim 1 wherein the scanning light beam comprises at least one laser beam.

20. Apparatus according to claim 19 wherein the controller encodes the scanning light beam with illumination position data by controlling the intensity of light in the at least one laser beam.

21. Apparatus according to claim 20 wherein the at least one laser beam is radiated by at least one laser and the controller controls the intensity of light in the at least one laser beam by controlling the frequency of laser voltage supplied to the at least one laser.

22. Apparatus according to claim 1 wherein images of the object from light reflected from the scanning light beam at a plurality of illumination positions are recorded in one image frame of the at least one photosensitive imager.

23. An apparatus according to claim 1 comprising a processor which determines three spatial coordinates for each of a plurality of localized surface areas of the object by decoding illumination position data detected at a plurality of image areas of the at least one photosensitive imager and wherein said processor uses the determined spatial coordinates to provide a three dimensional image of the object.

24. A method for 3 dimensional imaging of an object comprising:
    (a) scanning the object with a scanning light beam which comprises light of at least one wavelength and illuminates a localized surface region of the object from an illumination position, which illumination position comprises at least one of the location and orientation of the scanning light beam and wherein the scanning light beam is encoded with data corresponding to its illumination position;
    (b) reflecting light of the scanning light beam from the surface of the object from a plurality of successive illumination positions of the scanning light beam;
    (c) imaging a plurality of light rays of the reflected light on at least one photosensitive imager, wherein each of the plurality of light rays is reflected from a localized region on the surface of the object and light rays reflected from substantially different localized regions are imaged at different localized image regions of the at least one photosensitive imager;
    (d) detecting illumination position data encoded in the reflected light rays at the localized image regions at which the reflected light rays are imaged; and
    (e) determining three spatial coordinates for localized regions on the surface of the object from which light rays are reflected, using locations on the at least one photosensitive imager of said localized image regions and said illumination position data.

25. A method according to claim 24 wherein providing a scanning light beam encoded with data corresponding to an illumination position of the scanning light beam, comprises controlling the intensity of the scanning light beam to be different for different illumination positions.

26. A method according to claim 25 wherein registering illumination position data comprises detecting the intensity of light rays imaged.

27. A method according to claim 26 wherein controlling the intensity of the scanning beam comprises controlling the intensity of light in the scanning beam as a function of wavelength.

28. A method according to claim 27 wherein the scanning light beam comprises at least two wavelength bands of light, wherein controlling the intensity of light in the scanning beam comprises controlling the intensity of light in each band independently of the intensity of light in the other of the at least two bands of the scanning light beam.

29. A method according to claim 28 wherein controlling the intensity of light comprises controlling the intensity of light in the wavelength bands so that ratios between the intensities of light in different wavelength bands is different for different illumination positions.

30. A method according to claim 29 wherein controlling the intensity of light comprises controlling the intensity of light in one of the at least two bands so that the intensity in one of the at least two bands is a linear increasing function of an illumination position parameter and controlling the intensity of light in a different one of the at least two bands so that it is a linear decreasing function of the illumination position parameter.

31. A method according to claim 28 wherein at least one wavelength band of the wavelength bands is a narrow band of wavelengths.

32. A method according to claim 28 wherein the at least one photosensitive imager is one photosensitive imager.

33. A method according to claim 32 comprising imaging light rays having wavelengths in different wavelength bands of the scanning light beam at different localized image locations of the photosensitive imager.

34. A method according to claim 28 wherein the at least one photosensitive imager comprises at least two photosensitive imagers.

35. A method according to claim 34 comprising imaging light rays of the plurality of reflected light rays having wavelengths in different wavelength bands of the scanning light beam so that for any pair of photosensitive imagers of the at least two photosensitive imagers, there is at least one wavelength band such that, light rays having wavelengths in this at least one wavelength band are imaged by only one of the pair of the photosensitive imagers.

36. A method according to claim 34 wherein each of the at least one photosensitive imagers images light rays having wavelengths in only one of the wavelength bands of the scanning light beam.

37. A method according to claim 24 wherein the at least one photosensitive imager is a single photosensitive imager.

38. A method according to claim 24 wherein imaging reflected rays comprises imaging reflected rays twice for each of the at least one illumination position.

39. A method according to claim 24 wherein the scanning light beam is substantially a pencil beam.

40. A method according to claim 24 wherein the scanning light beam is a thin planar fan beam.

41. A method according to claim 40 wherein the illumination position of the fan beam is defined by at least one of, the position of an axis in the plane of the fan beam and a scan angle, wherein the scan angle is an angle of rotation of the fan beam about the axis and wherein the fan beam is encoded with the scan angle.

42. A method according to claim 41 wherein reflecting light from the surface of the object for at least one illumination position of the scanning light beam comprises reflecting light from the surface of the object from a scan angle.

43. A method according to claim 24 wherein the reflectivity of the surface of the object for light of different wavelengths in the scanning light beam is substantially the same.

44. A method according to claim 24 wherein the wavelengths of light in the scanning light beam are sufficiently close to each other so that the reflectivity of the surface of the object for the light of different wavelengths in the scanning light beam is substantially the same.

45. A method according to claim 24 wherein the scanning light beam comprises at least one laser beam.

46. A method according to claim 24 wherein the at least one illumination position comprises a plurality of illumination positions.

47. A method according to claim 46 comprising recording images of reflected light rays from at least two of the plurality of illumination positions on one image frame of the at least one photosensitive imager.

48. A method according to claim 24 wherein:

reflecting and imaging a plurality of light rays comprises:
(i) performing a first imaging of light rays reflected from localized surface regions of the object wherein the intensity of the scanning light beam is the same for each of the at least one illumination positions from which the light rays are reflected; and
(ii) performing a second imaging of light rays reflected from the localized surface regions of the object wherein the intensity of the scanning light beam is different for each of the at least one illumination positions from which the light rays are reflected; and wherein determining three spatial coordinates comprises dividing the intensity of light rays reflected from a localized region of the surface of the object from the second imaging by the intensity of light rays reflected from the localized region from the first imaging.

49. A method according to claim 24 wherein:

reflecting and imaging a plurality of light rays comprises:
(i) performing a first imaging of light rays reflected from localized surface regions of the object from light illuminating the object from ambient light sources; and
(ii) performing a second imaging of light rays reflected from the localized surface regions of the object from light in the scanning light beam; and wherein determining three spatial coordinates comprises subtracting the intensity of light rays reflected from a localized region of the surface of the object from the second imaging from the intensity of light rays reflected from the localized region from the first imaging.

50. A method according to claim 24 comprising producing a three dimensional image of the object using said determined spatial coordinates of localized regions on the surface of the object from which light rays are reflected.

* * * * *

UNITED STATES PATENT AND TRADEMARK OFFICE
CERTIFICATE OF CORRECTION

PATENT NO. : 6,765,606 B1
DATED : July 20, 2004
INVENTOR(S) : Gavriel J. Iddan et al.

It is certified that error appears in the above-identified patent and that said Letters Patent is hereby corrected as shown below:

Title page,
Item [56], References Cited, U.S. PATENT DOCUMENTS, add:
-- 5,334,848 A  8/1994
   5,157,451 A  10/1990 --
FOREIGN PATENT DOCUMENTS, add:
-- EP 0 465 806      1/1992 --

Signed and Sealed this

Twenty-fifth Day of January, 2005

JON W. DUDAS
*Director of the United States Patent and Trademark Office*